Dec. 4, 1928.　　A. E. OSWALD　　1,693,617

ELECTRIC MOTOR

Filed Sept. 19, 1925

Inventor:
Alfred E. Oswald
by B. C. Stickney
Attorney

Patented Dec. 4, 1928.

1,693,617

UNITED STATES PATENT OFFICE.

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE.

ELECTRIC MOTOR.

Application filed September 19, 1925. Serial No. 57,277.

The invention relates to electric motors.

An object of the invention is to provide a motor in which the speed may be readily changed by the operator, and which will maintain a uniform speed both on direct current and on alternating current of any commercial frequency.

An important feature is the provision of a movable field which effectuates speed control by reason of its relation to stationary brushes. The structure whereby the speed is controlled is especially simple, the number of parts being reduced to a minimum.

A feature of the field is the provision of two magnets. A pair of coils are mounted on each magnet, the coils on one magnet exerting magnetic force in the same direction while the coils on the other magnet at times oppose each other. The separation of the magnets prevents the magnetic action in one from interfering with the operation of the other, and also limits field-distortion, thereby affording, in the new organization, other novel advantages to be discussed later on.

A notable feature is the manner of connection of the coils. One of the two coils which, as mentioned, at times oppose each other is connected between a pair of auxiliary brushes. The other three coils may be said to be connected in series relation with main armature brushes. The voltage induced in the armature at the auxiliary brushes changes as the field is shifted and consequently varies the action of the coil connecting these brushes, thus strengthening or weakening the field and changing the speed of the motor.

Other features and advantages will hereinafter appear.

In the accompanying drawings.

Figure 1:
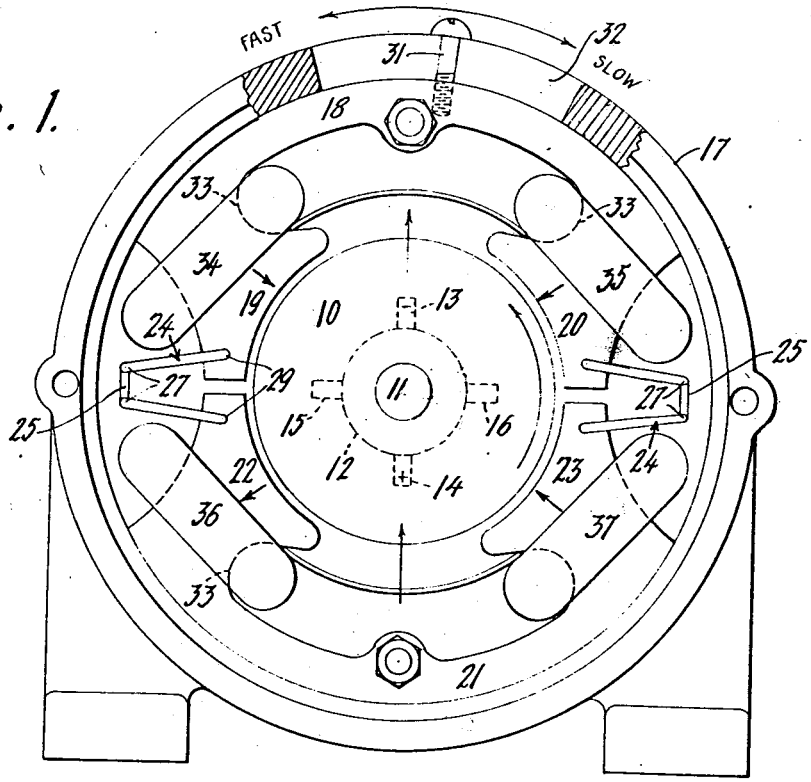
Figure 1 is a cross-sectional view of a motor embodying the invention.

The armature 10 of the motor has a shaft 11 and a commutator 12 which co-operates with a pair of main brushes 13 and 14 and a pair of auxiliary brushes 15 and 16. The brushes are mounted on a casing 17 which encloses a field. The field includes a magnet 18 having poles 19 and 20 and a magnet 21 having poles 22 and 23.

A pair of springs 24 are provided at each end of the magnets, tending to separate them and hold them against the inner surface of the casing 17 which may have a cylindrical recess 24' for receiving them. An end closure 24" for the casing 17 may prevent longitudinal movement of the magnets but does not prevent them from being moved angularly. Each spring may have a middle portion 25 and longitudinally-extending portions 26, which may have a tendency to expand and may be bent at 27, from which points they may extend radially inwardly, and may terminate in fingers 28 extending into apertures 29 in the magnet-poles. The springs space the magnets apart and ensure an air-gap between the two halves of the magnetic field. A piece of cord 30 or like non-conducting material may secure the middle portions 25 of adjacent springs together and prevent the springs from escaping from their positions.

The magnets 18 and 21 may be releasably secured in fixed position by means of a screw 31, which may be threaded into the magnet 18, and may extend through a slot 32 in the casing 17, and may engage, with its head, the exterior surface of the casing 17. The screw may be loosened and pushed laterally in the slot 32 for adjusting the field to a fast or a slow position indicated in Figure 1. The shifting of the field in this manner changes the speed of the motor, as will presently be described.

The magnets 18 and 21 are reduced in width adjacent the poles to provide necks 33, and coils 34, 35, 36 and 37 are supported on the necks adjacent poles 19, 20, 22 and 23, respectively.

Figure 4:
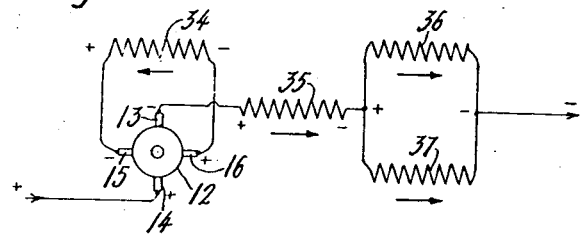
Figure 4 is a diagrammatic view, showing the manner in which the field-coils are connected and their relation to the armature and the armature brushes.
Figure 3:
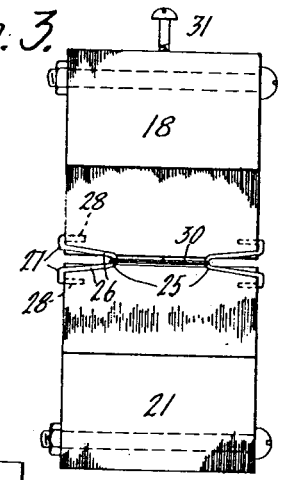
Figure 3 is a detail view of the field-magnets of the motor shown in Figure 1.
Figure 2:
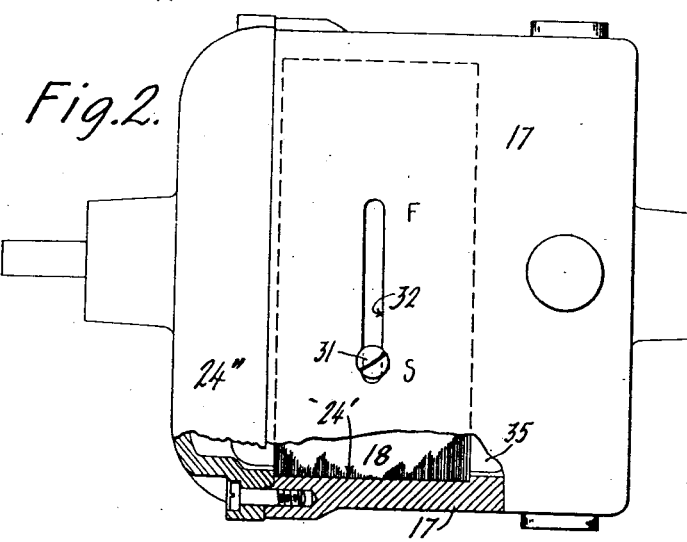
Figure 2 is a plan thereof, with parts broken away and parts in section.

Figure 4 illustrates the manner of connection of the coils. The current is transmitted from the line to the armature by the main brush 14, and from the armature by the main brush 13 to the coil 35, which is connected in series with the armature and in series with the coils 36 and 37, which are connected in parallel with each other. The coil 34 is connected between auxiliary brushes 15 and 16.

In the operation of the motor on direct current, there is no voltage between the auxiliary brushes 15 and 16 when the magnetic neutral plane is at right angles to the axis of the auxiliary brushes. The armature may have a standard drum winding, and its direction of rotation is assumed to be in the direction of the arrow. In Figure 1 it is assumed that there is no field distortion and the position of the field for no voltage between brushes 15 and 16 is therefore substantially as shown in said Figure 1. This assumption is made so that the function of the auxiliary brushes may be comprehended without considering field distortion. It is obvious that for any normal load and corresponding field distortion (if any) there is a corresponding magnetic neutral plane to which the axis of the brushes 15 and 16 may be referred. When the magnetic neutral plane is not at right angles to the axis of the auxiliary brushes there will be a voltage across said brushes 15 and 16, said voltage and its polarity at the brushes depending upon the extent and direction of deviation of the neutral plane from quadrature with the auxiliary brush axis. When the field is adjusted counterclockwise from the normal position shown in Figure 1, the brush 16 becomes positive because the point of maximum positive induced armature voltage is brought nearer to said brush 16 and farther from brush 15 which becomes negative. In Figure 4, the brush 16 is assumed to be positive, and sends current through the coil 34 in such direction as to weaken the field induced by coil 35, as indicated by the arrows in Figure 1. The coil 34 thus weakens the field and causes the motor to run faster. The extent to which the field is weakened depends upon the intensity of opposing current in coil 34, said intensity being proportional to the voltage across brushes 15 and 16, which voltage in turn depends on the counterclockwise adjustment of the field relative to the position of said brushes 15 and 16. When the field is in a "slow" position, which is in a clockwise direction from the position shown in Figure 1, the brush 16 is negative, because the point of maximum negative induced voltage has been brought nearer said brush 16. The current induced in the armature and taken off the auxiliary brushes 15 and 16 consequently traverses the coil 34 in a reverse direction, and the magnetic force of the coil 34 strengthens the field and causes the motor to run slower.

Each field coil has preferably the same number of turns, and in order that the flux across the poles 19 and 20 may be substantially the same as between poles 22 and 23 when the coil 34 is not functioning, the coil 35 is connected in series with coils 36 and 37, which are connected in parallel, (see Figure 4), so that twice as much current flows in coil 35 as in either coil 36 or 37. The coil 34 may be therefore considered as capable of causing either an increase or a decrease in the flux crossing the poles 19 and 20, depending upon the position of the field relatively to the brush axis of the auxiliary brushes 15 and 16.

In the operation of the motor on alternating current the voltage at the auxiliary brushes 15 and 16 is higher than the voltage at the same brushes during ordinary direct current operation. In direct current operation the extent to which the field-magnets are shifted is limited and therefore the drop across the auxiliary brushes 15 and 16 is limited. It will be noted in Figure 1 that the extent of the slot 32 in the casing on each side of the normal position of the field-magnet-clamping screw 31 determines the limit of field-magnet movement.

In alternating current operation of the motor there is induced in the armature coils on each side of the axis of the auxiliary brushes 15 and 16, the usual electromotive force due to the alternating flux between the poles of the stator. To understand why the voltage between brushes 15 and 16 may be higher on alternating current operation than on direct current, let it be assumed that the armature, in order to produce sufficient torque, has one thousand turns, and consequently there are five hundred turns on each side of the axis of the brushes 15 and 16, and that for satisfactory direct current operation each field-coil has two hundred turns. Let it be assumed further that on alternating current the total impedance drop across the series-parallel arrangement of coils 35, 36 and 37 is forty volts. With these assumptions in mind, it is evident that there will be a transformer-voltage across the brushes 15 and 16 of about fifty volts. The coil 34 may be also regarded as the secondary of a transformer of which the coil 35 is a primary, and has therefore induced therein a transformer-voltage which augments the transformer-voltage induced in the armature coils. Said armature coils and the coil 34 form a closed circuit in which considerable current flows due to the transformer-voltages, said current having the desirable effect of reducing the reactance of the motor and thereby developing the desired torque and quick pick-up.

Due to the preponderance of transformer-voltage at all adjustments of the field-magnet, the polarity of brush 16 is always of the same sign as that of brush 14, and the current in coil 34 is therefore always in an opposite direction to the current in coils 35, 36 and 37, except at the moment when the impressed voltage is zero. At that moment the motor acts as a generator and performs work in sending current through the coil 34, provided the field-magnet is in such position relatively to the brushes 15 and 16 that a voltage is generated between auxiliary brushes 15 and 16. The motor in thus sending current through the coil 34 has a momentary self-imposed load that checks the tendency of the motor to race away. This speed-checking tendency of the coil 34 is manifested only at no-load for it is obvious that when there is a load on the motor said load itself will check undue speed. The speed-checking tendency of the coil 34 also depends on the position of the field-magnet relatively to the brushes, and the speed of the motor may therefore be adjusted by adjusting the position of said field-magnet. Co-operating with the speed-regulating function of coil 34 is the well-known fact that the speed of a motor without the coil 34 may be adjusted by a relative shifting of the field-magnet and brushes. With the coil 34 functioning as described a larger range of speed adjustment is obtained both on direct current and alternating current than would be obtained by a relative shifting of the field-magnet and brushes of a motor in which a coil 34 did not function as described.

The transformer-voltage induced in the armature-coils varies as the field-structure is shifted. This variation of the transformer-voltage also influences the speed of the motor to some extent. This variation is obviously due to the same cause, whereby a variable voltage is induced in a flat loop, the variation of said voltage depending on the way said loop is tilted in the alternating field which induces said voltage.

It will be noted that separation of the field-magnets, as indicated in Figure 1, limits field-distortion; the field-structure thus embodying field-distortion-limiting means which facilitate changing the speed of the motor through the relative shifting of the brushes and field-structure. By providing such field-distortion-limiting means displacement of the magnetic neutral plane relatively to the field-structure in concomitance with the shifting of the brushes relatively to said structure is substantially minimized and the amount of relative angular displacement between said brushes and structure for a given speed change is materially reduced. This is because said angular displacement need not include an amount to compensate for the differential displacement of the neutral plane which would occur if no field-distortion-limiting means were provided. It will be understood that other field-distortion-limiting means than the means embodied in the separated magnets may be employed within the scope of the invention. The provision of field-distortion-limiting means enhances the practicability of shifting the field-structure relatively to all of the brushes, that is, relatively to both the main brushes and the auxiliary brushes, thus conducing to a still greater range of speed variation within the limits of a given displacement of the field-structure and brushes. In respect to the specific form of field-distortion-limiting means shown, that is, the separated magnets, it may be said that separation of said magnets, besides limiting field-distortion, enhances the positiveness with which the coil 34 controls the field of the motor. Thus the field-controlling influence of coil 34 is only opposed by the coils 35, both coils 34 and 35 being on the same semi-annular magnet-portion 18 which is magnetically independent of the opposite semi-annular magnet-portion 21 carrying the coils 36 and 37. Viewed in another way, separation of the magnets enables the coil 34 to exert a positive influence upon the intensity of the flux crossing the armature between the pole-faces, either directly increasing or directly decreasing said flux as the case may be and not diverting said flux around the magnetic circuit of the field-structure as would be the case if said structure were not divided as shown in Figure 1 into magnetically independent portions, each in itself having a yoke joining opposite poles straddling the armature and affording, with the armature, a complete magnetic circuit. By thus enabling the coil 34 to exert a positive flux-controlling influence the range of speed variation within the limits of a given displacement of the field-structure is still further increased. By reducing, through the provision of the novel organization herein shown, the displacement of field and brushes necessary for a given speed range, it results that such reduction of said displacement conduces to better commutation and less sparking at the brushes.

Wide variations may be made within the scope of the invention. For example, the described motor may be said to be bi-polar but the invention may be embodied in motors other than bi-polar. Portions of the improvements may be used without others; for instance, the idea of a shiftable field for speed control may be embodied in motors having diverse coil arrangements.

Having thus described my invention, I claim:

1. In an electric motor, the combination of an armature, a commutator, a pair of main brushes, a pair of auxiliary brushes, each brush of a pair being between and fixed relatively to the brushes of the other pair, a field-structure embodying means capable of substantially limiting field distortion and displacement of the magnetic neutral plane relatively to said field-structure, said field-structure including a coil in series with said main brushes and also including a coil connected across said auxiliary brushes and controlling the magnetism of the first-mentioned coil whereby the speed of said motor may be controlled, and means for variously setting the relative positions of said field-structure and all of said brushes.

2. In an electric motor, the combination of an armature, a commutator, a pair of main brushes, a pair of auxiliary brushes, each brush of a pair being between and fixed relatively to the brushes of the other pair, and a field-structure embodying means capable of substantially limiting field distortion and displacement of the magnetic neutral plane relatively to said field-structure, said field-structure including a coil in series with said main brushes and also including a coil connected across said auxiliary brushes and controlling the magnetism of the first-mentioned coil whereby the speed of said motor may be controlled, all of said brushes as a whole and said field-structure being relatively shiftable for changing the speed of said armature.

3. In an electric motor, the combination of an armature, a commutator, a pair of main brushes, a pair of auxiliary brushes, each brush of a pair being between and fixed relatively to the brushes of the other pair, and a field-structure embodying means capable of substantially limiting field distortion and displacement of the magnetic neutral plane relatively to said field-structure, said field-structure including a coil in series with said main brushes and also including a coil connected across said auxiliary brushes and controlling the magnetism of the first-mentioned coil whereby the speed of said motor may be controlled, said field-structure being mounted for movement relatively to all of said brushes as a whole for changing the speed of said armature.

4. In an electric motor, an armature, a commutator, a pair of main brushes, a pair of auxiliary brushes, each brush of a pair being between the brushes of the other pair, and a field magnet structure including four coils, three of said coils being connected up so that each one produces force in the same direction, and the fourth coil being connected across said auxiliary brushes, said field magnet structure being shiftable in one direction relatively to said brushes for causing said fourth coil to oppose the action of the other coils, and increase the speed of said armature, said field magnet structure being shiftable also in another direction to cause said fourth coil to increase the force of the other coils and decrease the speed of said armature.

5. In an electric motor, an armature, a commutator, a pair of main brushes, a pair of auxiliary brushes, each brush of a pair being between brushes of the other pair, and a field structure including a pair of magnets and a pair of coils on each of said magnets, three of said coils being connected so that each produces flux in the same direction, and the fourth coil being connected across said auxiliary brushes for the purpose of controlling said flux.

6. In an electric motor, the combination of an armature, a commutator, a pair of main brushes, a pair of auxiliary brushes, each brush of a pair being between the brushes of the other pair, and a field magnet embodying field-distortion-limiting means and including a plurality of coils, one of said coils being connected across said auxiliary brushes to serve as speed-controlling means, and the other coils being connected in series with said main brushes.

7. In an electric motor, an armature, a commutator, a pair of main brushes, a pair of auxiliary brushes, each brush of a pair being between the brushes of the other pair, and a field magnet including four coils, one of said coils being connected across said auxiliary brushes, a pair of others of said coils being connected in parallel with each other and in series with another, the fourth, of said coils which, in turn, is connected in series with said main brushes.

8. In an electric motor, an armature, a commutator, a pair of main brushes, a pair of auxiliary brushes, each brush of a pair being between the brushes of the other pair, and a field magnet mounted for angular movement and including four coils, one of said coils being connected across said auxiliary brushes, a pair of said coils being connected in parallel with each other and in series with the fourth of said coils which, in turn, is connected in series with said main brushes, the first-mentioned coil being connected to said auxiliary brushes to operate in opposition to the other coils when said field magnet is shifted in one direction and to strengthen said other coils when the field magnet is shifted in another direction.

9. In an electric motor, an armature, a commutator, a plurality of main and auxiliary brushes, speed-controlling means co-operating with said auxiliary brushes, and a field-structure co-operating with said armature and said brushes and shiftable relatively to all of said brushes for altering the relation of the field magnetism to said armature, said field-structure embodying field-distortion-limiting means.

10. In an electric motor, an armature, a commutator, a plurality of brushes and a shiftable field magnet including a plurality of coils, one of said coils connected across a pair of brushes and the other coils connected in series with the other brushes, said field magnet being shiftable relatively to said brushes, to change the direction of current in said one coil to cause it to oppose or aid the rest of said coils, and thereby vary the magnetic field.

11. In an electric motor, the combination of a commutator, a casing, a plurality of brushes supported by said casing and a magnetically complete field magnet structure, including a plurality of coils and embodying field-distortion-limiting means supported by said casing, said field magnet structure being shiftable in said casing relatively to said brushes, to change the speed of armature rotation.

12. In an electric motor, an armature, a commutator, a pair of brushes, a field magnet embodying field-distortion-limiting means and including a coil, and means including auxiliary brushes connecting said coil to said armature to take off current induced in said armature, said field magnet being shiftable relatively to said auxiliary brushes for altering the strength of the current transmitted to said coil, thereby controlling the speed of the motor.

13. In an electric motor, an armature, a commutator, a pair of brushes, a casing and a field structure within said casing, said field structure including a pair of magnets spaced apart and magnetically independent, said field structure also being shiftable relatively to said casing and said brushes, for controlling the speed of armature rotation.

14. In an electric motor, a casing, a pair of separate field magnets mounted for angular movement in said casing and means for forcing said magnets apart and pressing them against the inner surface of said casing.

15. In an electric motor, a casing, a pair of separate field magnets mounted for angular movement in said casing, and resilient means for forcing said magnets apart and pressing them against the inner surface of said casing.

16. In an electric motor, a casing, a pair of separate field magnets mounted for angular movement in said casing, and springs for forcing said field magnets apart and pressing them against the inner surface of said casing.

17. In an electric motor, a casing, a pair of separate field magnets mounted for angular movement in said casing, resilient means for forcing said magnets apart and pressing them against the inner surface of said casing, and means for securing said magnets in any position within a predetermined range.

18. In an electric motor, a casing, a pair of separate field magnets mounted in said casing, and resilient means for forcing said magnets apart and thereby pressing them against the inner surface of said casing.

19. In an electric motor, a casing, a pair of separate field magnets mounted for angular movement within said casing, means for spacing said magnets apart and releasable means for securing said magnets in diverse positions of adjustment relative to said casing.

20. In an electric motor having an armature, the combination of a casing having a slot therein, a field-structure mounted for angular movement in said casing, said structure including separate semi-annular iron portions and means for spacing said portions apart, each portion having a pair of poles straddling said armature and also having a yoke joining said poles, and a field-clamping member secured to one of said portions and projecting through said slot for angularly adjusting said structure and holding it fixed in its adjusted position relatively to said casing.

21. In an electric motor having an armature, the combination of a casing having a slot therein, a field-structure mounted for angular movement in said casing, said structure including separate semi-annular iron portions and means for spacing said portions apart, each portion having a pair of poles straddling said armature and also having a yoke joining said poles, and a clamp-screw projecting from the periphery of one of said portions and through said slot for angularly adjusting said structure and holding it in its adjusted position relatively to said casing.

22. In an electric motor, an armature, a commutator, a plurality of brushes, a field magnet including a plurality of coils connected to said brushes for operating the motor, said coils and brushes having permanent connections, and means embodied in said motor, for changing the direction and intensity of current in one of said coils.

23. In an electric motor, an armature, a field structure including a pair of magnets having adjacent poles and a plurality of coils, one coil being mounted at each pole of said magnets, three of said coils being connected up so that the current in each exercises magnetic force in the same direction, the fourth coil being connected up to oppose the action of the other coils, and means for varying the opposition of said fourth coil.

24. In an electric motor, an armature, a commutator, a pair of main brushes, a pair of auxiliary brushes, each brush of a pair being between the brushes of the other pair, a field structure including a pair of magnets and a pair of coils for each of said magnets, each magnet pole having a single coil thereon, two of said coils exerting magnetic force in the same direction, and being connected in parallel with each other, and in series with another of said coils, which exerts magnetic force in the same direction, and which in turn is connected in series with said main brushes, the remaining coil being connected across the auxiliary brushes, and means whereby said last coil may be caused to aid or oppose the action of the other three coils, to vary the speed of the motor.

25. In an electric motor, an armature, a commutator, a pair of main brushes, a pair of auxiliary brushes, each brush of a pair being between the brushes of the other pair and a field structure including a pair of magnets, and a pair of coils for each of said magnets, each magnet pole having a single coil thereon, two of said coils exerting magnetic force in the same direction, and being connected in parallel with each other, and in series with another of said coils, which exerts magnetic force in the same direction, and which in turn is connected in series with said main brushes, the remaining coil being connected between the auxiliary brushes, said field structure being mounted for movement relative to said brushes for changing the direction and intensity of current taken off said auxiliary brushes and thereby changing the speed of armature rotation.

26. In an electric motor having an armature, the combination of a casing having a slot therein, a field-structure mounted for angular movement in said casing, said structure including separate semi-annular iron portions and means for spacing said portions apart, each portion having a pair of poles straddling said armature and also having a yoke joining said poles, and field-clamping means projecting through said slot for angularly adjusting said structure and holding it fixed in its adjusted position relatively to said casing.

27. In an electric motor, the combination with an armature, a commutator, and brushes co-operating therewith, of a field-structure, the entire field-structure and brushes being relatively shiftable for speed regulation, said field-structure embodying field-distortion-limiting means, whereby shifting of the magnetic neutral plane relatively to said field-structure in concomitance with the relative shifting of the brushes and field-structure is substantially minimized.

28. In an electric motor, the combination with an armature, a commutator, and brushes co-operating therewith, of a field-structure, the entire field-structure and brushes being relatively shiftable for speed regulation, said field-structure embodying separate and magnetically independent magnets, whereby shifting of the magnetic neutral plane relatively to said field-structure in concomitance with the relative shifting of the brushes and field-structure is substantially minimized.

29. In an electric motor, the combination with an armature, a commutator, and brushes co-operating therewith, of a field-structure, the entire field-structure and brushes being relatively shiftable for speed regulation, said field-structure embodying two half-magnets, each having a pair of coils, one of the coils of one half-magnet depending on the relative positions of the brushes and field-structure to weaken or strengthen its half-magnet, said half-magnets being separate and magnetically independent to facilitate the field-controlling function of said one coil and also to substantially minimize shifting of the magnetic neutral plane of the entire field-structure in concomitance with the relative shifting of the brushes and field-structure.

30. In an electric motor, the combination with an armature, a commutator, and brushes co-operating therewith, of a field-structure, the entire field-structure and brushes being relatively shiftable for speed regulation, said field-structure embodying two half-magnets, one of said half-magnets having a coil depending on the relative positions of the brushes and field-structure to weaken or strengthen said one half-magnet, said half-magnets being separate and magnetically independent to facilitate the field-controlling function of said one coil and also to minimize shifting of the magnetic neutral plane of the entire field-structure concomitantly with the shifting of the relative brushes and field-structure.

31. In an electric motor, the combination with an armature, a commutator, and brushes co-operating therewith, of a field-structure, the entire field-structure and brushes being relatively shiftable for speed regulation, said field-structure embodying two half-magnets, each provided with an exciting winding, the winding of one half-magnet having substantially the same field-exciting capacity as the winding of the other half-magnet, and an additional winding on one of said half-magnets, said additional winding depending upon the relative positions of the brushes and field-structure to weaken or strengthen its half-magnet, said half-magnets being separate and magnetically independent to facilitate the field-controlling function of said one coil and also to substantially minimize shifting of the magnetic neutral plane of the entire field-structure concomitantly with the relative shifting of the brushes and said field-structure.

ALFRED E. OSWALD.